UNITED STATES PATENT OFFICE.

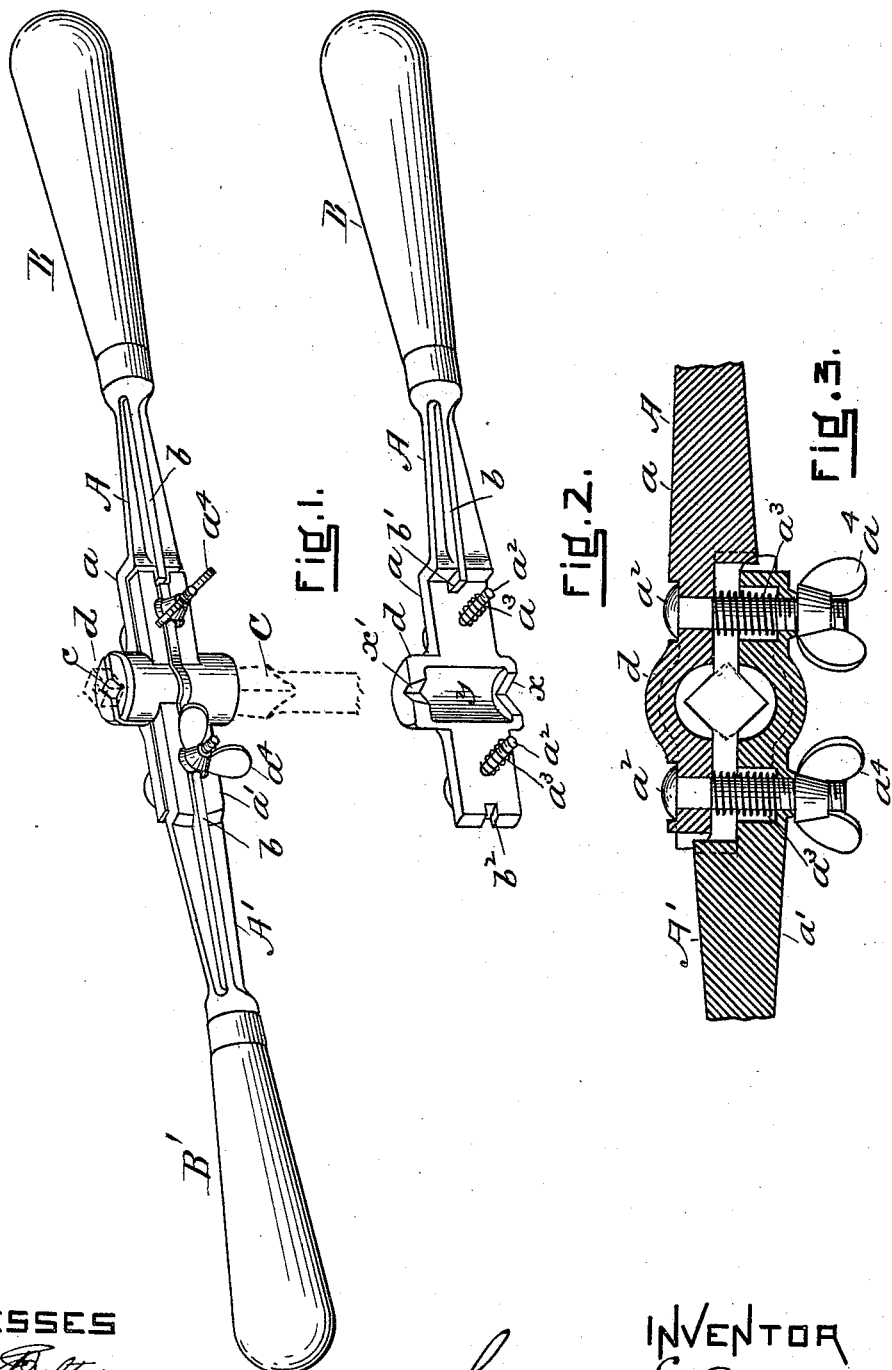

GEORGE E. ROGERS, OF GREENFIELD, ASSIGNOR TO THE MILLER'S FALLS COMPANY, OF MILLER'S FALLS, MASSACHUSETTS.

AUGER-HANDLE.

SPECIFICATION forming part of Letters Patent No. 484,050, dated October 11, 1892.

Application filed January 9, 1892. Serial No. 417,451. (No model.)

*To all whom it may concern:*

Be it known that I, GEORGE E. ROGERS, of Greenfield, in the county of Franklin and State of Massachusetts, have invented a certain new and useful Improvement in Auger-Handles, of which the following, taken in connection with the accompanying drawings, is a specification.

My present invention relates to handles for use in connection with augers, bits, and similar tools.

The details will be readily understood, as the view of the completed handle is shown in Figure 1, a view of one-half in Fig. 2, and a sectional view of the central parts and body is shown in Fig. 3.

In the drawings like letters of reference indicate corresponding parts.

The object of my present invention is to furnish a light and convenient handle easily adjustable for holding different sizes and styles of auger and bit shanks and a handle that can be packed in a chest or other receptacle without injury and without inconvenience. The handle is preferably formed of metal in two pieces, with a handle either integral or suitably secured to the said pieces.

In the drawings, A represents one piece, and A' the other. These are designed to be secured together by the bolts $a^2 a^2$ and the thumb-screws $a^4 a^4$. It will be seen that the outer parts of the pieces A A' are preferably made straight, with the ribs $b\ b$ to strengthen the pieces, and the said ribs $b\ b$ may be extended, as shown at $b'$ in Fig. 2, so that a sort of tenon will be formed to fit the slot or mortise $b^2$, formed in the end of the opposite piece. It will be seen that this will aid to strengthen the handle when in use very materially, though it is not essential to the invention. The form of the parts is well shown in Fig. 2, in which B B' are the handles, and A the straight portion of the handle proper, with the offset parts $a\ a'$, as shown, with rib and tenon $b\ b'$ and mortised end $b^2$. In the center of the completed or united handle is formed a body with a hole extending through the same, each half of the handle having half of the shell of the body $d$ made integral with the part $a$ of piece A. The under side of the shell $d$ has a suitable opening $x$, and the upper side a smaller corresponding hole $x'$. When the two parts of the handle are brought together, the shank of an auger is held firmly by the contact with the body of the shell $d$, the two parts being drawn together by the bolts $a^2 a^2$ and nuts $a^4 a^4$. The nut usually found on the end of the shanks of augers is screwed on above the body of the united handle, the end of the auger-shank projecting through, as shown in Fig. 1, the auger-shank being indicated by C, and the nut on end of said shank by $c$. On the bolts $a^2 a^2$ I preferably place a spiral spring to disengage the two parts of the handle A A' when the thumb-screws $a^4 a^4$ are removed or partially removed from the screw-bolts $a^2 a^2$. The body $d$ is formed with a sort of shell, as shown in Fig. 2, the said shell of body $d$ being made hollow, with the ends closed, except the holes $x$ and $x'$, for the admission of the shank of the auger, as described. The inner portion of the shell (indicated by $y$) is suitably formed to receive and hold the shank of an ordinary bit-shank or ordinary tool-shank. It will be observed that if the part of bit-shank that is usually squared near the end is placed above the opening $x$ in the shell and the end of the said bit-shank is allowed to project through opening $x'$ in the shell-body $d$, the said handle will thus form an efficient holding device for nearly all bits without any fitting.

One of the advantages of my handle is that the two parts forming the same may be easily taken apart and the same carried in the pocket or conveniently packed with other tools. The lightness and ready adjustability, together with the simplicity and consequent comparative cheapness of construction, are advantages in its favor.

Having thus shown and described my invention, what I claim, and desire to secure by Letters Patent of the United States, is—

The within-described handle, consisting of the removable pieces A A', the bolts $a^2 a^2$, screw-threaded at their outer ends, and screw-threaded thumb-nuts $a^4$ $a^4$, and springs $a^3$ $a^3$, all suitably adapted to receive and hold the shank of an auger or similar tool-shank, substantially as and for the purposes described.

In testimony whereof I have signed my name to this specification, in the presence of two subscribing witnesses, on this 5th day of January, A. D. 1892.

GEO. E. ROGERS.

Witnesses:
W. N. SNOW,
C. W. LANFAIR.